(12) United States Patent
Chung et al.

(10) Patent No.: US 6,731,618 B1
(45) Date of Patent: May 4, 2004

(54) CODING FOR MULTI-USER COMMUNICATION

(75) Inventors: Sae-Young Chung, Waltham, MA (US); Dae-Young Kim, Lexington, MA (US)

(73) Assignee: Airvana, Inc., Chelmsford, MA (US)

( * ) Notice: Subject to any disclaimer, the term of this patent is extended or adjusted under 35 U.S.C. 154(b) by 34 days.

(21) Appl. No.: 09/693,567

(22) Filed: Oct. 20, 2000

(51) Int. Cl.⁷ ................................................. H04Q 7/00
(52) U.S. Cl. ........................ 370/328; 370/209; 370/335; 370/342; 370/441; 375/130
(58) Field of Search .................. 370/328, 329, 370/330, 333, 335, 337, 342, 344, 347, 349, 441, 209; 455/227, 228, 229, 230, 463, 466; 375/130; 714/751, 776, 777, 786

(56) References Cited

U.S. PATENT DOCUMENTS

| | | | | |
|---|---|---|---|---|
| 5,146,472 A | * | 9/1992 | Hallman | 375/8 |
| 5,701,302 A | * | 12/1997 | Geiger | 370/521 |
| 6,049,530 A | * | 4/2000 | Petersen et al. | 370/248 |
| 6,064,662 A | * | 5/2000 | Gitlin et al. | |
| 6,304,650 B1 | * | 10/2001 | Takeshita | 379/219 |
| 6,393,012 B1 | * | 5/2002 | Pankaj | 370/342 |
| 2001/0053141 A1 | * | 12/2001 | Periyalwar et al. | |
| 2002/0013135 A1 | * | 1/2002 | Proctor, Jr. | |
| 2002/0018446 A1 | * | 2/2002 | Huh et al. | |

OTHER PUBLICATIONS

3GPP2 C.P9010, CDMA2000 High Rate Packet Data Air Interface Specification, Sep. 2000.
3GPP2 C50–2000–0918–014, "1xEV–DV Forward Channel Structure," Lucent Technologies, Sep. 2000.
3GPP2 C50–2000–0918–015, "Reverse Link Structure for 1xEV–DV," Lucent Technologies, Sep. 2000.
A.J. Viterbi, CDMA Principles of Spread Spectrum Communication, pp. 1–9, Copyright 1995.

* cited by examiner

Primary Examiner—Dang Ton
Assistant Examiner—Shick Hom
(74) Attorney, Agent, or Firm—Fish & Richardson P.C.

(57) ABSTRACT

Packets are generated for delivery over a forward communication channel from a base station to a remote station, in which a parameter that characterizes the packets being generated is determined adaptively based on factors not limited to the data rate of the channel.

24 Claims, 4 Drawing Sheets

FIGURES

CODING FOR MULTI-USER COMMUNICATION

BACKGROUND

This invention relates to coding for multi-user communication.

We use the following acronyms in our discussion:

| | |
|---|---|
| 1xEV-DO | 1xEV-Data Only |
| 1xEV-DV 1xEV | Data and Voice |
| 3GPP2 | 3rd Generation Partnership Project 2 |
| BS | Base Station |
| CDMA | Code Division Multiple Access |
| IS-95 | TIA/EIA Interim Standard 95 |
| SIR | Signal-to-Interference Ratio |
| MS | Mobile Station |
| FPDCH | Forward Packet Data Channel |
| RAI | Rate and Antenna Indication |
| IR | Incremental Redundancy |
| MIMO | Multiple Input Multiple Output |
| FEC | Forward Error-correcting Code |
| MAC | Medium Access Control |

As shown in FIG. 2, in wireless cellular communications, a large geographic area is divided into cells, each served by a single base station 10 communicating with multiple mobile stations 12 in its cell.

3GPP2, a standards organization developing third generation wireless communication standards, has developed a new wireless air interface standard called 1xEV-DO (3GPP2 C.P9010, CDMA2000 High Rate Packet Data Air Interface Specification, incorporated by reference; see also, A. J. Viterbi, CDMA Principles of Spread Spectrum Communication). This standard supports high-speed data communications between mobile stations (MS's) and their base station (BS) at bit rates of up to 2.457 Mbit/s in the forward link (from BS to MS's) using only 1.25 MHz of spectrum. However, 1xEV-DO does not efficiently support delay-sensitive, low-rate traffic, such as voice.

3GPP2 is developing a new air interface standard called 1xEV-DV, which supports three modes of traffic delivery: (1) Real-time, (2) Non-real-time, and (3) Mixed real-time/non-real-time. This standard is intended to be inter-operable with the CDMA2000 1x standard.

Lucent, Inc. has made a proposal to 3GPP2 for the 1xEV-DV standard (3GPP2 C50-2000-0918-014, "1xEV-DV Forward Channel Structure," Lucent Technologies, September 2000; and 3GPP2 C50-2000-0918-015, "1xEV-DV Proposal," Lucent Technologies, September 2000, both incorporated by reference) that includes two modes: single antenna and multi-antenna (called MIMO). We discuss only the single antenna case here although our invention can also be applied to MIMO.

Lucent's 1xEV-DV proposal defines new channels on top of channels used in the CDMA2000 1x standard. One of the new channels in the forward link is called the Forward Packet Data Channel (FPDCH).

The FPDCH uses Walsh Codes that are not used by other channels, such as fundamental channels that are used for voice. Multiple MSs share the FPDCH as a common, dynamically changing code space in a time multiplexed fashion. Each MS continually predicts the SIR from all active BS's using the burst pilot and/or the continuous pilot. From the SIR information along with the allocated power and code space for the FPDCH, the MS can choose a forward link rate and give notice of this rate to the BS through the reverse link RAI channel.

The MS also predicts whether multiple transmit antennas would aid the communication for its channel conditions. The FPDCH is shared by packet data MSs using time-multiplexing.

As shown in FIG. 3, the FPDCH 16 includes the following time-multiplexed subchannels: the Forward Packet Data Pilot Subchannel 22, the Forward Packet Data Traffic Subchannel 24, and the Forward Packet Data Preamble Subchannel 26. The Traffic Subchannel carries customer data packets.

Each subchannel is further decomposed into code division multiplexed quadrature Walsh channels. The number of Walsh channels may vary in time. Each of the parallel streams of the FPDCH is covered by a distinct 16-ary/32-ary/64-ary/128-ary Walsh function at a chip rate that will yield Walsh symbols at 76.8 ksps/38.4 ksps/19.2 ksps/9.6 ksps. The Walsh-coded symbols of all the streams are summed together to form a single in-phase stream and a single quadrature stream at chip rates of 1.2288 Mcps. The resulting chips are time-division multiplexed with the preamble and pilot subchannel chips to form the resultant sequence of chips for the quadrature spreading operation.

The preamble is a QPSK-modulated channel that has all '0' symbols sent on the in-phase channel. The in-phase signal is covered by a 32-chip bi-orthogonal sequence and the sequence is repeated several times depending on the RAI rate. The bi-orthogonal sequence is specified in terms of the 32-ary Walsh functions and their bit-by-bit complements which represents the 6-bit MAC address of the destination.

The Forward Packet Data Traffic Subchannel encoder packets can be transmitted in 1 to 32 slots as shown in Table 1, below, where one slot is 1.25 msec. For each RAI rate, the encoder packets are divided into 1, 2 or 4 sub-packets. Each subpacket can have 1, 2, 4, or 8 slots. Each slot consists of 320 chips of pilots and 1216 chips for data and preamble.

TABLE 1

| | | Short Format | | | | |
|---|---|---|---|---|---|---|
| RAI Rate (kbps) | Starting Rate (kbps) | Number Of Sub-packets | Number Of slots Per subpacket | Bits/ Encoder Packet | Code Rate | Modulation Type |
| 9.6 | 38.4 | 4 | 8 | 384 | 1/5 | QPSK |
| 19.2 | 76.8 | 4 | 4 | 384 | 1/5 | QPSK |
| 38.4 | 153.6 | 4 | 2 | 384 | 1/5 | QPSK |
| 76.8 | 307.2 | 4 | 2 | 768 | 1/5 | QPSK |
| 153.6 | 614.4 | 4 | 1 | 768 | 1/3 | QPSK |
| 307.2 | 1228.8 | 4 | 1 | 1536 | 1/3 | QPSK |
| 614.4 | 1228.8 | 2 | 1 | 1536 | 1/3 | QPSK |
| 1228.8 | 1228.8 | 1 | 1 | 1536 | 1/3 | QPSK |
| 921.6 | 1843.2 | 2 | 1 | 2304 | 1/3 | 8-PSK |
| 1843.2 | 1843.2 | 1 | 1 | 2304 | 1/3 | 8-PSK |
| 1228.8 | 2457.6 | 2 | 1 | 3072 | 1/3 | 16-QAM |
| 2457.6 | 2457.6 | 1 | 1 | 3072 | 1/3 | 16-QAM |
| 1536 | 3072 | 2 | 1 | 3840 | 1/2 | 16-QAM |
| 3072 | 3072 | 1 | 1 | 3840 | 1/2 | 16-QAM |

The Lucent proposal uses Asynchronous Incremental Redundancy, which works as follows. When an MS is scheduled to be serviced on the FPDCH, rather than sending the entire encoder packet to the MS at an effective rate that is equal to the RAI rate, the BS initially transmits only the first sub-packet. In this case, in the preamble, the Sub-Packet Sequence Number is set to '00'. The sub-packet is preceded by the preamble whose length is dictated by the RAI rate.

The actual length of preamble is given in Table 2, below.

TABLE 2

| RAI Rates (9.6 kbps) | 32-Chip Preamble Sequence Repetition | Preamble Chips per Encoder Sub-Packet |
|---|---|---|
| 9.6 | 128 | 4096 |
| 19.2 | 64 | 2048 |
| 38.4 | 32 | 1024 |
| 76.8 | 16 | 512 |
| 153.6 | 8 | 256 |
| 307.2 | 4 | 128 |
| Others up to (3072.0) | 2 | 64 |

If the MS detects the preamble and succeeds in decoding the sub-packet, transmission is successful and the MS sends an ACK back. The effective rate of the MS in this case is equal to the number of sub-packets times the RAI rate.

If the MS detects the preamble but is not successful in decoding the sub-packet, it sends a NACK back. In this case, the next sub-packet is transmitted by the BS the next time the MS is scheduled for service. Then, the Sub-Packet Sequence Number is set to '01'.

Due to the asynchronous nature of the IR operation, every sub-packet needs to be preceded by a preamble. The preamble gives the mobile station information about the sequence number of the sub-packet. During the course of the incremental redundancy operation, each sub-packet may be received with a different preamble size because this value is completely dictated by the current RAI rate.

In incremental redundancy operation, if the user is not able to detect/decode the preamble, it sends neither an ACK nor a NACK. The set of rates signaled by the RAI channel, their corresponding slot and sub-slot structures as well as the encoder packet coding and modulation types are listed in Table 1 for Non-MIMO configurations. Table 1 shows the number of slots and sub-packets required as proposed by Lucent.

The overall Forward Packet Data Channel structure is shown in FIG. 4 for BSs with a single transmit antenna.

SUMMARY

In general, in one aspect, the invention features generating packets for delivery over a forward communication channel from a base station to a remote station, in which a parameter that characterizes the packets being generated is determined adaptively based on factors not limited to the data rate of the channel.

Implementations of the invention may include one or more of the following features. The factors may include the levels of power used to send the packets (which will affect rate per dimension at the MS), or the availability of code space used to send the packets, or both. The adaptively determined parameter that characterizes the packets may be the time-length of the packets or the number of time slots, or the number of bits per encoder packet, or forward error correcting scheme, or modulation scheme, or any combination of them. The forward communication channel may be a forward packet data preamble subchannel of a wireless communication system. The preamble subchannel may carry auxiliary information at the same time that MAC address is also being carried. The MAC address part of the preamble data may be coded using bi-orthogonal signaling or other block coding schemes, such as Hamming, extended Hamming, Golay, Reed-Muller, BCH, Reed-Solomon, or parity check codes. The coded address is then spread in one or multiple blocks of Walsh function depending on the number of dimensions or code space available for the preamble. The energy required to send the preamble may be spread substantially evenly among the blocks. The remote station may be a mobile wireless station.

Other advantages and features will become apparent from the following description and from the claims.

FIGURE DESCRIPTION

FIG. 1 shows performance of a bi-orthogonal signaling scheme with repetition. From right to left, repetition factors are 1, 2, 4, 8, 16, 32, 64, 128. Vertical bars indicate channel capacity of each scheme from right to left, respectively. When there is no repetition, this scheme is about 7 dB from capacity and when the repetition is 128, it is more than 10 dB from capacity at the error probability 10-6.

DESCRIPTION

Figure 1:
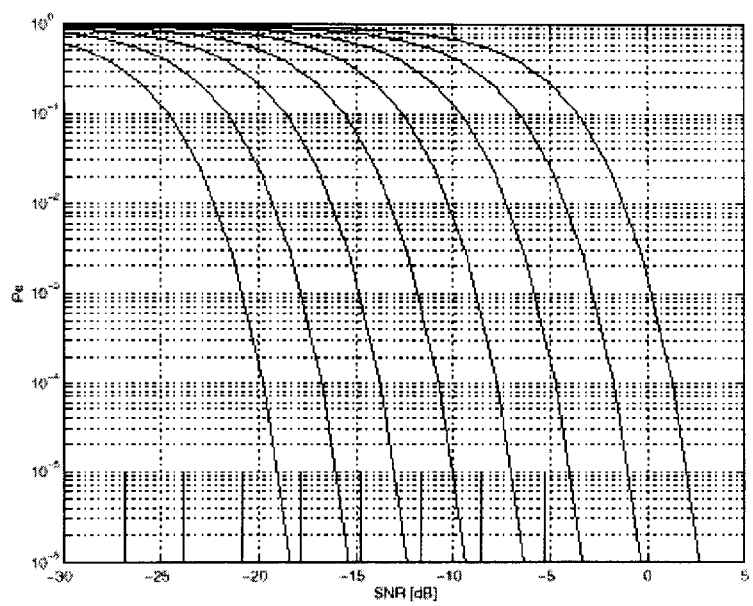
Figure 2:
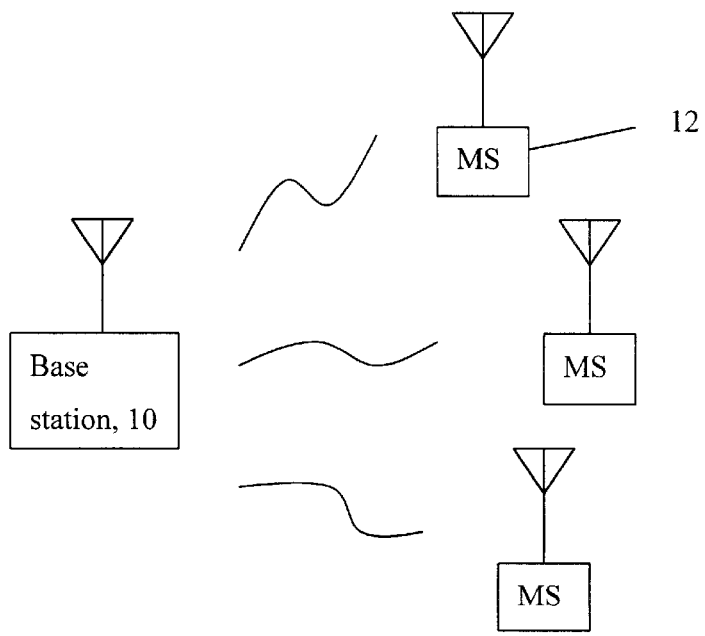
FIG. 2 shows a multi-user communication system.
Figure 3:
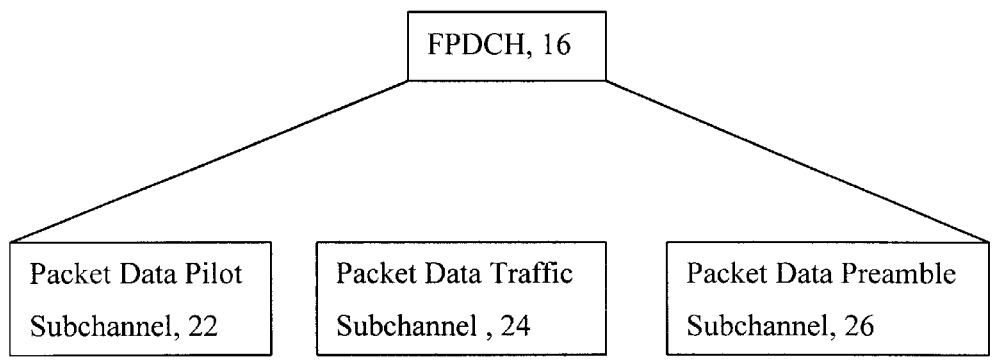
FIG. 3 shows the make up of an FPDCH.
Figure 4:
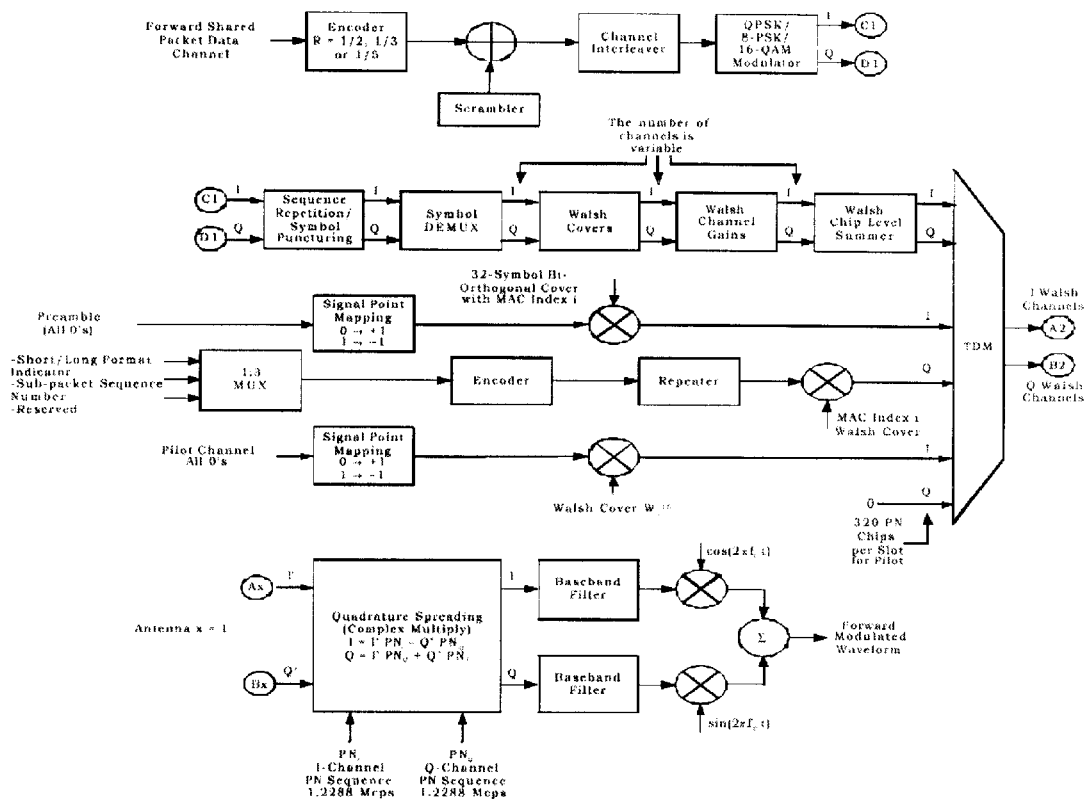
FIG. 4 shows the FPDCH structure of the Lucent scheme for a single transmit antenna.
Figure 5:
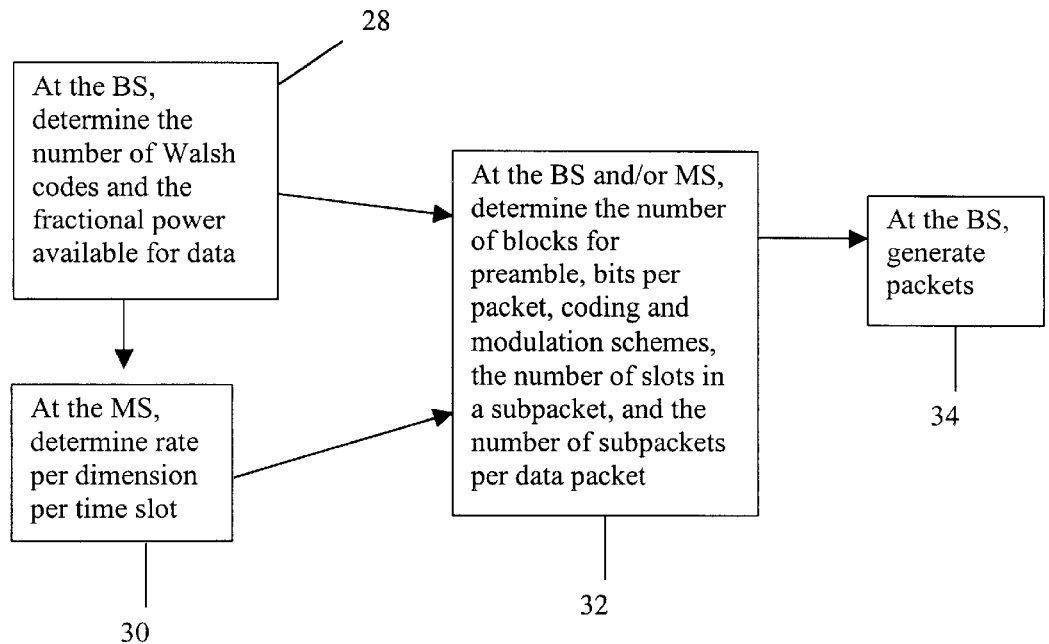
FIG. 5 shows a process diagram for generating packets.

The preamble proposed by Lucent employs all 64 bi-orthogonal Walsh codes with length 32. This approach has a high chance of causing the preamble to look the same as the fundamental channel or other channels that are used for real-time signals such as voice. An improved preamble encoding scheme only uses the code space of FPDCH to carry the preamble.

Lucent's proposal uses a fixed number of slots and a fixed number of bits per encoder packet in the forward link for a given data rate. It also uses a preamble per sub-packet so that the MS can know if is intended for it by decoding the preamble. As the Lucent proposal uses a fixed number of slots for a given rate independently of how much power and many Walsh codes are allocated to FPDCH, the loss due to the preamble can be large. Because the information that is transferred by the preamble is fixed (10 bits per preamble in case of the Lucent proposal, 6 bits for MAC address and 4 bits for auxiliary data), as the fractional power and Walsh codes allocated for FPDCH shrinks, the portion used by the preamble compared to the customer data gets bigger and eventually reduces the data rate and/or increases data error rate.

In the improvement discussed below, the capacity loss due to preamble is small for all values of fractional power and/or codes space for FPDCH. Or one can make tradeoffs between capacity loss due to preamble and packet size. In the improvement described here, the packet size is a variable number of time slots that depends on the fractional power and/or number of Walsh codes (i.e., amount of code space) assigned to FPDCH.

In the Lucent proposal, because the encoding scheme is solely based on the data rate, the encoding scheme may not be a good one for some values of code space and power available for FPDCH.

The system described below has an encoding scheme that is different even for the same data rate depending on the rate per code dimension (which can be derived from SIR and available code space) and/or code space for FPDCH.

NEW CODING SCHEME FOR THE PREAMBLE

The forward packet data preamble subchannel is used to transmit the destination MAC address for the forward packet data. The forward packet data is transmitted through the forward packet data traffic subchannel, which follows the forward packet data preamble subchannel. In Lucent's proposal, the 6-bit MAC address is encoded using bi-orthogonal signaling, and then the resulting 32-dimensional vector is transmitted in 32 chips (which we call a block), by using 32-ary Walsh functions. This block is repeated as shown in Table 2.

Let $W_n$ denote an n×n Hadamard matrix scaled by 1/sqrt n, where n is a power of two. This scaling makes the matrix unitary, which preserves lengths and angles. The 6-bit MAC address is encoded using bi-orthogonal signaling into a 32-dimensional vector u, where one coordinate is + or −sqrt 32 and the remaining 31 coordinates are zeros. Sqrt 32 is multiplied to normalize the power per dimension to one. This vector u is then multiplied by $W_{32}$ and the resulting 32-dimensional vector is transmitted through the in-phase channel.

Bi-orthogonal signaling enables the mobile station to decode the preamble easily and to distinguish it from the data and pilot parts. However, Lucent's scheme requires an interruption of the pilot, voice, and control signals during the transmission of the preamble, because all available dimensions are used for transmitting the preamble in the period.

The improvement uses an enhanced coding scheme for the preamble to resolve this issue.

Figure 6:
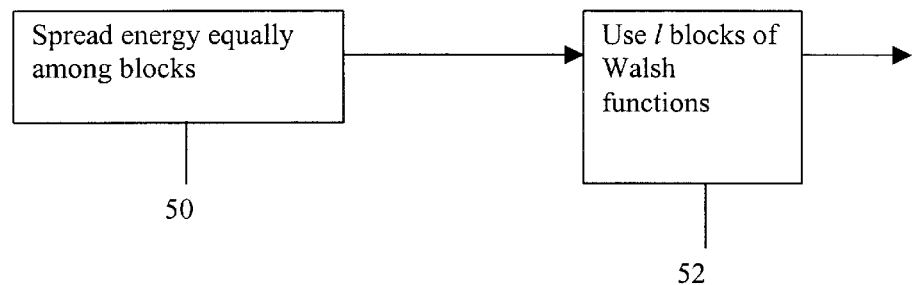
FIG. 6 shows a process for generating preamble packets.

In this section and with reference to FIG. 6, we show how to design a coding scheme for the preamble that has a performance comparable to Lucent's but does not interfere with voice, pilot, and control signals that need to be transmitted simultaneously with the preamble.

Let n−m be the dimensions occupied by such other signals and let m be the dimensions available for the preamble, where n=32 is the total number of dimensions available. We use bi-orthogonal signaling for the preamble, because its decoding is simple and it enables the decoder to easily distinguish it from data and pilot parts. To use bi-orthogonal signaling, we need 32 dimensions. Since we have only m dimensions available for the preamble, we need more than one 32-chip block to send the preamble using the bi-orthogonal signaling. More specifically, we need at least l such blocks 52 where l is the smallest integer such that l times m is greater than or equal to n. If we send the 32-dimensional vector u using l blocks by assigning m dimensions to the first l−1 blocks and assigning the remaining dimensions to the last block, then one of the blocks contains an active signal with amplitude sqrt n while the other l−1 blocks use no energy for the preamble data. This will cause an imbalance in the total power in each block, which would not be desirable.

To fix this problem, we can preprocess u by multiplying it by a real unitary matrix which spreads the energy of u equally in l blocks. For example, a Hadamard matrix (properly scaled) can be used. To find this unitary matrix that has a small number of non-zero elements (for easier decoding), we consider the following scheme.

Let k be the largest integer that is a power of two and for which k is less than or equal to m. For now, we assume we have n/k 32-chip blocks for the preamble, which could be slightly larger than l. Later, we will discuss a scheme that uses only l blocks. Let $I_k$ be a k×k identity matrix. Let $U_{n,k}$ be an n/k×n/k block-Hadamard matrix scaled by 1/sqrt n, where each element is + or $-I_k$ instead of + or −1's. For example, if k=4 and n=8, then the matrix $U_{n,k}$ will look like the following:

$$U_{n,k} = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{pmatrix}$$

Therefore, $U_{n,k}$ is a real n×n unitary matrix. It is easy to see that each n/k 32-chip block contains equal energy for the preamble data when u is replaced by $U_{n,k}u$. At the decoder, the only extra step needed is a multiplication by $U^*_{n,k}=U_{n,k}^{rt}$ to obtain u back, which 5 can be implemented efficiently because $U_{n,k}$ has a small number of non-zero elements. Note that if k<m, then we can increase the power of u by m/k because not all m dimensions are used. We may use $I_m$ to construct an (ml')×(ml') block-Hadamard matrix H with l'×l' blocks of $I_m$'s from an l'×l' Hadamard matrix by replacing 1 by $I_m$, where l' is the smallest integer that is a power of two and ml' is greater than or equal to n. Let U' be the upper-left n×n sub-matrix of H scaled by 1/sqrt n. We may send U' u instead of u and use $U'^{rt}$ to decode u at the receiver. For all possible values of u, U' u distributes power equally in l blocks. However, since U' is not unitary in general, this may correlate the additive white Gaussian noise and change the distances between codewords.

PROBABILITY OF ERROR FOR PREAMBLE

In this section, we show the performance of the proposed coding scheme. Since it is designed to have the same performance as the bi-orthogonal signaling using all 32 dimensions, the results presented in this section are the same for both schemes.

Although we can use a simple union bound for error probability analysis, we will use simulations for more accuracy since there are 62 nearest neighbors in the 32-dimensional bi-orthogonal signaling scheme and the union bound becomes less accurate as the number of nearest neighbors increases.

FIG. 1 shows the performance of a bi-orthogonal signaling scheme with repetition. From right to left, repetition factors are r=1, 2, 4, 8, 16, 32, 64, 128. Each 3 dB decrease in SNR requires an additional repetition factor of two, because repetition merely corresponds to increasing power.

Vertical bars indicate the channel capacity of each scheme from right to left, respectively, i.e., the rate of each scheme is $\frac{3}{16}r[b/D]$, where r is the repetition factor. Therefore, these schemes are about 7 to 8 dB from capacity at the error probability $10^5$.

Because the data frame is protected by a stronger coding scheme, i.e., a turbo code, in Lucent's scheme, the decoder can operate closer to the channel capacity, say, for example, 3 dB. Because the preamble data is more important than data, we assume it requires additional 1 to 2 dB compared to the data frame.

This means that we need to design the repetition factor for the preamble so that the channel capacity of the bi-orthogonal scheme is about (7 to 11)+(1 to 2)−3=5 to 10 dB from the channel capacity of the turbo coding scheme.

This implies that the rate of the preamble data needs to be about 3 to 10 times smaller than the rate of the data frame at low-SNR regime.

QUADRATURE CHANNEL

Because we send the 6-bit MAC address in the preamble through the in-phase channel, we can send other data through the quadrature channel.

Lucent's proposal sends 4 bits of auxiliary information such as a Short/Long Format Indicator and a Sub-packet Sequence Number in the Q channel of the Forward Packet Data Preamble Subchannel.

Since there are only 4 bits to transmit through the quadrature channel, we can simply add 2 zero bits to the 4-bit auxiliary data and use the coding scheme described in the previous section to send this 6 symbols, where each symbol consists of 2 bits—one in-phase and the other quadrature components.

ADAPTIVE-DIMENSION CODING FOR FORWARD PACKET DATA TRAFFIC

Tables 1 and 2 reflect the encoding scheme proposed by Lucent. The RAI rate is the actual data rate. However, in this scheme, no consideration was made for the case when code dimension is not fully available. We will use Na for the number of subpackets, Nb for the number of slots per sub-packet, and Nbits for the number of bits per Encoder packet.

Let us assume, for example, that we have ¼ of the code space for data and ¼ of the total power per slot for data. In this case, we need to transmit the data in 4 s slots, where s is the number of slots needed to transmit the data when the code space and power are fully available. In this case, the data rate is decreased to ¼. Since the SNR is not changed when the code space and power are both scaled down to ¼, we should use the same FEC and modulation schemes. However, Table 1 suggests that if the data rate is decreased to ¼, the FEC rate is decreased from ½ to ⅓ and the modulation scheme is changed from 16-QAM to QPSK (assuming RAI is decreased from 3072 kbps to 614.4 kbps). This new encoding is not optimal to achieve the target rate, because we should use the same modulation and coding scheme when the channel SNR is unchanged. In the following, we describe how to do this.

Tables 3, 4, and 5 below show the required number of sub-packets and the number of slots per sub-packets for various requested rate. RAI is assumed to be based on the assumption that all dimensions are available. This rate can be calculated by a equation such as the capacity equation log 2(1+αP/βN), where P is the total received power, N is total noise, α is the power fraction used for FPDCH, and β is the fraction of the code space used for FPDCH. Note that this number does not change if both α and β scales by the same amount. It is better to use the same FEC and modulation scheme when this rate is the same. Note that instead of this number, rate per code dimension can also be used. The actual data rate will be RAI times the available fractional code dimension, e.g., if only half of the code space is available, the actual data rate is RAI/2. The MS notifies to the BS not the actual data rate but the rate assuming all code dimension is available or rate per code dimension. BS can calculate the actual data rate since it knows how much code space is available.

TABLE 3

Number of Slots and subpackets required when a half of dimensions are available. RAI is the requested rate assuming all dimensions are available. The actual rate is ½ of the RAI due to lack of code dimensions.

| | | Short Format | | | | |
|---|---|---|---|---|---|---|
| RAI Rate (kbps) | Starting Rate (kbps) | Number Of Sub-packets | Number Of slots Per subpacket | Bits/ Encoder Packet | Code Rate | Modulation Type |
| 9.6 | 38.4 | 4 | 16 | 384 | 1/5 | QPSK |
| 19.2 | 76.8 | 4 | 8 | 384 | 1/5 | QPSK |
| 38.4 | 153.6 | 4 | 4 | 384 | 1/5 | QPSK |
| 76.8 | 307.2 | 4 | 4 | 768 | 1/5 | QPSK |
| 153.6 | 614.4 | 4 | 2 | 768 | 1/3 | QPSK |
| 307.2 | 1228.8 | 4 | 2 | 1536 | 1/3 | QPSK |
| 614.4 | 1228.8 | 2 | 2 | 1536 | 1/3 | QPSK |
| 1228.8 | 1228.8 | 1 | 2 | 1536 | 1/3 | QPSK |
| 921.6 | 1843.2 | 2 | 2 | 2304 | 1/3 | 8-PSK |
| 1843.2 | 1843.2 | 1 | 2 | 2304 | 1/3 | 8-PSK |
| 1228.8 | 2457.6 | 2 | 2 | 3072 | 1/3 | 16-QAM |
| 2457.6 | 2457.6 | 1 | 2 | 3072 | 1/3 | 16-QAM |
| 1536 | 3072 | 2 | 2 | 3840 | 1/2 | 16-QAM |
| 3072 | 3072 | 1 | 2 | 3840 | 1/2 | 16-QAM |

TABLE 4

Number of Slots and subpackets required when a quarter of dimensions are available. RAI is the requested rate assuming all dimensions are available. The actual rate is ¼ of the RAI due to lack of code dimensions.

| | | Short Format | | | | |
|---|---|---|---|---|---|---|
| RAI Rate (kbps) | Starting Rate (kbps) | Number Of Sub-packets | Number Of slots Per subpacket | Bits/ Encoder Packet | Code Rate | Modulation Type |
| 9.6 | 38.4 | 4 | 32 | 384 | 1/5 | QPSK |
| 19.2 | 76.8 | 4 | 16 | 384 | 1/5 | QPSK |
| 38.4 | 153.6 | 4 | 8 | 384 | 1/5 | QPSK |
| 76.8 | 307.2 | 4 | 8 | 768 | 1/5 | QPSK |
| 153.6 | 614.4 | 4 | 4 | 768 | 1/3 | QPSK |
| 307.2 | 1228.8 | 4 | 4 | 1536 | 1/3 | QPSK |
| 614.4 | 1228.8 | 2 | 4 | 1536 | 1/3 | QPSK |
| 1228.8 | 1228.8 | 1 | 4 | 1536 | 1/3 | QPSK |
| 921.6 | 1843.2 | 2 | 4 | 2304 | 1/3 | 8-PSK |
| 1843.2 | 1843.2 | 1 | 4 | 2304 | 1/3 | 8-PSK |
| 1228.8 | 2457.6 | 2 | 4 | 3072 | 1/3 | 16-QAM |
| 2457.6 | 2457.6 | 1 | 4 | 3072 | 1/3 | 16-QAM |
| 1536 | 3072 | 2 | 4 | 3840 | 1/2 | 16-QAM |
| 3072 | 3072 | 1 | 4 | 3840 | 1/2 | 16-QAM |

TABLE 5

Number of Slots and subpackets required when a quarter of dimensions are available. RAI is the requested rate assuming all dimensions are available. The actual rate is ¼ of the RAI due to lack of code dimensions.

| | | Short Format | | | | |
|---|---|---|---|---|---|---|
| RAI Rate (kbps) | Starting Rate (kbps) | Number Of Sub-packets | Number Of slots Per subpacket | Bits/ Encoder Packet | Code Rate | Modulation Type |
| 9.6 | 38.4 | 4 | 32 | 384 | 1/5 | QPSK |
| 19.2 | 76.8 | 4 | 16 | 384 | 1/5 | QPSK |
| 38.4 | 153.6 | 4 | 8 | 384 | 1/5 | QPSK |
| 76.8 | 307.2 | 4 | 4 | 384 | 1/5 | QPSK |

TABLE 5-continued

Number of Slots and subpackets required when a quarter of dimensions are available. RAI is the requested rate assuming all dimensions are available. The actual rate is ¼ of the RAI due to lack of code dimensions.

Short Format

| RAI Rate (kbps) | Starting Rate (kbps) | Number Of Sub-packets | Number Of slots Per subpacket | Bits/ Encoder Packet | Code Rate | Modulation Type |
| --- | --- | --- | --- | --- | --- | --- |
| 153.6 | 614.4 | 4 | 2 | 384 | 1/3 | QPSK |
| 307.2 | 1228.8 | 4 | 1 | 384 | 1/3 | QPSK |
| 614.4 | 1228.8 | 2 | 1 | 384 | 1/3 | QPSK |
| 1228.8 | 1228.8 | 1 | 1 | 384 | 1/3 | QPSK |
| 921.6 | 1843.2 | 2 | 1 | 576 | 1/3 | 8-PSK |
| 1843.2 | 1843.2 | 1 | 1 | 576 | 1/3 | 8-PSK |
| 1228.8 | 2457.6 | 2 | 1 | 768 | 1/3 | 16-QAM |
| 2457.6 | 2457.6 | 1 | 1 | 768 | 1/3 | 16-QAM |
| 1536 | 3072 | 2 | 1 | 960 | 1/2 | 16-QAM |
| 3072 | 3072 | 1 | 1 | 960 | 1/2 | 16-QAM |

If not all dimensions are available, then we can simply increase the number of slots until we have enough dimensions for the data packet. This will decrease the actual data rate by the same factor.

The same is true for the preamble. We need to increase the number of 32-chip blocks for the preamble as the number of available dimensions decreases.

This could cause a large increase in the total time to transmit a data packet, which is inversely proportional to the number of dimensions available. Even though this helps minimize the preamble overhead, excessive increase in the transmission time can be a problem. This can be somewhat compensated in two ways. First, we can try to set a lower limit on the fraction of dimensions reserved to data to a certain number, say ¼. Secondly, we can try to use fewer bits per encoder packet. However, if we decrease the number of bits per packet by too much, then it will degrade the performance of the turbo coder. For high-SNR case, this could be actually desirable because the largest number of bits per packet, i.e., 3840, might be too big anyway and is wasted to send short size MAC or higher layer packet. Table 5 shows how to reduce the block size by decreasing $N_b$ while maintaining the minimum block size of 384.

In general, Nbits/$N_b$ should be increased by a factor of β, where β is the fraction of available dimensions. For example, in Table 3, we may use $N_b$=1 and Nbits=1920 for the last row.

One can define how to set Nbits and Nb for a given rate per code dimension and β, or one can define multiple choices and let MS choose it on the fly by sending rate per code dimension and choice of Nb to BS.

CONCLUSION

We have shown how to design a system that can transmit preamble data through the forward packet data preamble subchannel without sacrificing performance when not all power and/or not all code space are available due to other data, such as voice and pilot, being transmitted simultaneously.

We have also shown how to design a system that can transmit forward packet data without sacrificing performance when not all power and/or not all code space are available.

These two schemes are adaptive to the size of available code space and the amount of power available for sending the preamble and data while only slightly increasing the complexity of the system proposed by Lucent.

Other embodiments are within the scope of the following claims.

What is claimed is:

1. A method comprising,
generating packets for delivery over a forward communication channel from a base station to a remote station, the forward communication channel comprising a forward packet data preamble subchannel of a wireless communication system,
adaptively determining a parameter that characterizes the packets being generated based on factors not limited to a data rate of the forward communication channel, and
spreading energy required to send preamble data substantially evenly among time slots using a unitary matrix,
wherein the preamble data occupies more than one block of Walsh functions depending on code space available.

2. The method of claim 1 in which a block Hadamard matrix comprising identity matrices is used as the unitary matrix.

3. The method of claim 1 in which the forward communication channel further comprises a forward packet data subchannel, wherein one of the packets is transmitted over the forward packet data subchannel and the preamble data is transmitted over the forward packet data preamble subchannel.

4. The method of claim 1 in which the factors comprise at least one of a data rate per Walsh code of one of the packets and availability of Walsh code space used to send the packet.

5. The method of claim 1 in which the parameter that characterizes the packets is part of a set of parameters including one or more parameters, the one or more parameters comprising any combination of a time length of one of the packets, a number of time slots over which the packet is transmitted, a number of bits contained in the packet, a forward error correction scheme used for encoding the packet, and a modulation scheme used for modulating the packet.

6. A method comprising:
generating at a base station a data packet for delivery over a forward communication channel from the base station to a remote station,
wherein one or more parameters that characterize the data packet being generated are determined adaptively based on factors not limited to the data rate of the data packet; and
generating at the base station preamble data conveying information on the one or more parameters for delivery over the forward communication channel from the base station to the remote station,
wherein the preamble data occupies more than one block of Walsh functions and a unitary matrix is used to spread energy of the preamble data substantially evenly among the blocks of Walsh functions the preamble data occupies.

7. The method of claim 6 in which a block Hadamard matrix comprising identity matrices is used as the unitary matrix.

8. The method of claim 6 in which the forward communication channel comprises a forward packet data preamble subchannel and a forward packet data subchannel, where the data packet is transmitted over the forward packet data subchannel and the preamble data is transmitted over the forward packet data preamble subchannel.

9. The method of claim 6 in which the factors comprise a data rate per Walsh code of the data packet.

10. The method of claim 9 in which the remote station transmits to the base station information conveying the data rate per Walsh code of the data packet.

11. The method of claim 9 in which the remote station transmits to the base station information conveying the data rate per Walsh code of the data packet assuming all Walsh codes are available for the data packet.

12. The method of claim 6 in which the factors comprise availability of Walsh code space used to send the data packet.

13. The method of claim 6 in which the factors comprise both a data rate per Walsh code of the data packet and availability of Walsh code space used to send the data packet.

14. The method of claim 6 in which the one or more parameters comprise a time length of the data packet.

15. The method of claim 14 in which the one or more parameters comprise a number corresponding to time slots over which the data packet is transmitted.

16. The method of claim 6 in which the one ore more parameters comprise a number corresponding to bits contained in the data packet.

17. The method of claim 6 in which the one or more parameters comprise a forward error correction scheme used for encoding the data packet.

18. The method of claim 6 in which the one ore more parameters comprises a modulation scheme used for modulating the data packet.

19. The method of claim 6 in which the one or more parameters that characterize the packet comprise any combination of a time length of the data packet, a number of time slots over which the data packet is transmitted, a number of bits contained in the data packet, a forward error correction scheme used for encoding the data packet, and a modulation scheme used for modulating the data packet.

20. The method of claim 6 in which the preamble data comprises a destination MAC address of the remote station.

21. The method of claim 6 in which the preamble data comprises auxiliary information.

22. The method of claim 6 in which the preamble data is encoded using a block coding.

23. The method of claim 6 in which the preamble data is modulated using a bi-orthogonal signaling.

24. The method of claim 6 in which the remote station comprises a wireless mobile station.

* * * * *